United States Patent
Kim et al.

(10) Patent No.: US 8,042,963 B2
(45) Date of Patent: Oct. 25, 2011

(54) OPTICAL MEMBER, METHOD OF MANUFACTURING THE OPTICAL MEMBER AND BACKLIGHT ASSEMBLY HAVING THE OPTICAL MEMBER

(75) Inventors: Seung-Mo Kim, Cheonan-si (KR); Kang-Woo Lee, Suwon-si (KR); Jin-Sung Choi, Cheonan-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 312 days.

(21) Appl. No.: 12/468,472

(22) Filed: May 19, 2009

(65) Prior Publication Data

US 2009/0296374 A1 Dec. 3, 2009

(30) Foreign Application Priority Data

Jun. 2, 2008 (KR) .................................. 2008-51797

(51) Int. Cl.
*G09F 13/04* (2006.01)
(52) U.S. Cl. ...................... 362/97.1; 362/97.2; 362/97.4; 362/620
(58) Field of Classification Search .................. 362/97.1, 362/97.2, 97.4, 620, 626, 607
See application file for complete search history.

(56) References Cited

U.S. PATENT DOCUMENTS

| | | | | |
|---|---|---|---|---|
| 6,606,133 | B1 * | 8/2003 | Okabe | 349/65 |
| 7,753,565 | B2 * | 7/2010 | Hsu et al. | 362/339 |
| 7,804,564 | B2 * | 9/2010 | Min et al. | 349/112 |
| 2009/0021667 | A1 * | 1/2009 | Horiguchi et al. | 349/64 |

FOREIGN PATENT DOCUMENTS

| | | |
|---|---|---|
| KR | 10-0557451 | 2/2006 |
| KR | 10-2008-0004802 | 1/2008 |
| KR | 10-2008-0005198 | 1/2008 |

OTHER PUBLICATIONS

English Abstract for Publication No. 1020050087101 (for 10-0557451), Aug. 31, 2005.
English Abstract for Publication No. 1020080004802, Jan. 10, 2008.
English Abstract for Publication No. 1020080005198, Jan. 10, 2008.

* cited by examiner

*Primary Examiner* — Evan Dzierzynski
(74) *Attorney, Agent, or Firm* — F. Chau & Associates, LLC

(57) ABSTRACT

An optical member includes a base body, a plurality of light-concentrating lenses and a plurality of light-diffusing patterns. The base body has a first surface and a second surface which is opposite to the first surface and receives light from light sources. The light-concentrating lenses are formed on the first surface. The light-diffusing patterns are respectively formed at positions of the second surface respectively corresponding to the light sources to reduce an amount of light reflected by the light-concentrating lenses. Each of the light-diffusing patterns includes curved surfaces extending in a first direction and has a width which is in a predetermined range. The light-diffusing patterns are separated from one another in a second direction substantially perpendicular to the first direction.

12 Claims, 6 Drawing Sheets

OPTICAL MEMBER, METHOD OF MANUFACTURING THE OPTICAL MEMBER AND BACKLIGHT ASSEMBLY HAVING THE OPTICAL MEMBER

PRIORITY STATEMENT

This application claims priority under 35 U.S.C. §119 from Korean Patent Application No. 2008-51797, filed on Jun. 2, 2008 in the Korean Intellectual Property Office (KIPO), the contents of which are herein incorporated by reference in their entirety.

BACKGROUND OF THE INVENTION

1. Field of the Invention

Embodiments of the present invention relate to an optical member, a method of manufacturing the optical member, and a backlight assembly having the optical member. More particularly, embodiments of the present invention relate to an optical member disposed on light sources, a method of manufacturing the optical member, and a backlight assembly having the optical member.

2. Description of the Related Art

A flat panel display device such as a liquid crystal display (LCD) device generally requires a backlight device providing a display panel of the flat panel display device with light. The backlight device is disposed under the display panel.

The backlight device is classified as either an edge-type backlight device or a direct-type backlight device according to the position of a light source, such as a lamp, employed in the backlight device. In the direct-type backlight device, a plurality of lamps is disposed directly under the display panel. Therefore, since a large amount of light is provided to the display panel by the direct-type backlight device, the direct-type backlight device is generally employed in a large display device.

Nowadays, flat panel display devices are required to be thin. In order to manufacture a thin flat panel display device, the thickness of a backlight device has to be small. However, the lamps and an optical member, such as a diffusing plate, may need to be separated from each other by more than a minimum distance to improve the brightness uniformity of light from the backlight device.

Techniques for reducing the distance between the light source and the optical member without reducing the brightness or the brightness uniformity have been developed. Examples include an optical member having improved light-diffusing capacity and light-concentrating capacity and an optical member having multiple functions.

When the distance between the lamps and the optical member decreases or when a distance between adjacent lamps employed in the backlight assembly increases, a brightness difference between positions of the optical member directly on the lamps and positions of the optical member between the lamps may be increased. That is, bright regions may be generated at the positions of the optical member directly on the lamps and dark regions may be generated at the positions of the optical member between the lamps. The bright and dark regions may be, for example, linear.

In order to prevent the bright regions and the dark regions from being generated, a prism sheet may be disposed on the optical member. However, although the prism sheet is disposed on the optical member, the bright regions and the dark regions may still be generated. In addition, prisms of the prism sheet for concentrating the light may reflect a portion of the light perpendicularly incident upon the prism sheet so that the light passing through the prism sheet may form dark lines directly on the lamps.

SUMMARY OF THE INVENTION

Embodiments of the present invention provide a receiving container capable of reducing the weight and thickness of a liquid crystal display (LCD) device, and the number of modules employed in the LCD device.

Embodiments of the present invention also provide a display device having the receiving container.

According to one aspect of the present invention, there is provided an optical member. The optical member includes a base body, a plurality of light-concentrating lenses and a plurality of light-diffusing patterns.

The base body has a first surface and a second surface opposite to the first surface. The second surface receives light from a plurality of light sources. The light-concentrating lenses are formed on the first surface at a predetermined pitch. The light-diffusing patterns are respectively formed at positions of the second surface respectively corresponding to the light sources to reduce an amount of light reflected by the light-concentrating lenses. Each of the light-diffusing patterns may include curved surfaces extending in a first direction and have a width which is in a range determined by the following inequality.

$$H \times \tan\{90°-a-\cos^{-1}(1/n)\} < D < H \times \tan\{90°-3a+\cos^{-1}(1/n)\}$$

In the inequality, 'H' is a distance between the light sources and the second surface, 'a' is an angle between an external surface of one of the light-concentrating lenses and the first surface, 'n' is a refractive index of the light-concentrating lenses, and 'D' is the width of each light-diffusing pattern.

The curved surfaces may include convex surfaces with respect to the second surface or concave surfaces with respect to the second surface. A cross-section of each curved surface may include one of a substantially semicircular shape, a substantially half-oval shape and a substantially polygonal shape.

The light-concentrating lenses protrude from the first surface and may have a substantially prism shape or a substantially half-cylindrical shape.

The light-diffusing patterns may be separated from one another in a second direction substantially perpendicular to the first direction.

According to another aspect of the present invention, there is provided a backlight assembly. The backlight assembly includes a plurality of lamps and an optical member.

The lamps are disposed in parallel and separated from one another. The optical member includes a base body, a plurality of light-concentrating lenses and a plurality of light-diffusing patterns. The base body is disposed on the lamps. The base body has a first surface emitting light and a second surface opposite to the first surface. The second surface receives the light from the lamps. The light-concentrating lenses may be formed on the first surface at a predetermined pitch. The light-diffusing patterns may be respectively formed at positions of the second surface which are respectively disposed directly on the lamps. Each of the light-diffusing patterns has a width which is in a range determined by the following inequality.

$$H \times \tan\{90°-a-\cos^{-1}(1/n)\} < D < H \times \tan\{90°-3a+\cos^{-1}(1/n)\}$$

In the inequality, 'H' is a distance between the lamps and the second surface, 'a' is an angle between an external surface of one of the light-concentrating lenses and the first surface, 'n' is a refractive index of the light-concentrating lenses, and 'D' is the width of each light-diffusing pattern.

Each of the light-diffusing patterns may include curved surfaces extending in a first direction. The curved surfaces may include convex surfaces with respect to the second surface or concave surfaces with respect to the second surface. A cross-section of each curved surface may include one of a substantially semicircular shape, a substantially half-oval shape and a substantially polygonal shape. The light-concentrating lenses protrude from the first surface and may have a substantially prism shape or a substantially half-cylindrical shape.

The backlight assembly may further include a receiving container, a diffusing plate and a brightness enhancement sheet. The receiving container may include a bottom plate on which the lamps are disposed and sidewalls supporting the optical member. The diffusing plate may be disposed between the lamps and the optical member. The brightness enhancement sheet may be disposed on the optical member.

The light-diffusing patterns may be separated from one another in a second direction substantially perpendicular to the first direction.

According to another aspect of the present invention, there is provided a method of manufacturing an optical member. In the method, a plurality of light-concentrating lenses may be formed on a first surface of a base body at a predetermined pitch. Then, a plurality of light-diffusing patterns may be formed on a second surface of the base body which is opposite to the first surface of the base body. Each of the light-diffusing patterns may include a plurality of curved surfaces extending in a first direction. The light-diffusing patterns may be separated from one another.

For forming the plurality of the light-diffusing patterns, a first roller may roll on the second surface of the base body to form the curved surfaces on the second surface of the base body and the curved surfaces may be light-cured. An external surface of the first roller may have first patterns having a shape which is substantially complementary to a shape of the curved surfaces.

The first patterns of the first roller may include convex surfaces with respect to the external surface of the first roller and the curved surfaces may include concave surfaces with respect to the second surface of the base body. Alternatively, the first patterns of the first roller may include concave surfaces with respect to the external surface of the first roller and the curved surfaces may include convex surfaces with respect to the second surface of the base body.

For forming the plurality of the light-concentrating lenses, a second roller may rolls on the first surface of the base body to form the light-concentrating lenses on the first surface of the base body, and then, the light-concentrating lenses may be light-cured. An external surface of the second roller may have second patterns having a shape which is substantially complementary to a shape of the light-concentrating lenses.

The first roller and the second roller may simultaneously form the light-concentrating lenses and the light-diffusing patterns on the base body.

The base body may be formed of a polymer resin.

According to the optical member, the method and the backlight assembly, an optical member may prevent bright regions and dark regions to provide planar light having improved brightness uniformity.

DETAILED DESCRIPTION OF EXEMPLARY EMBODIMENTS

Figure 1:
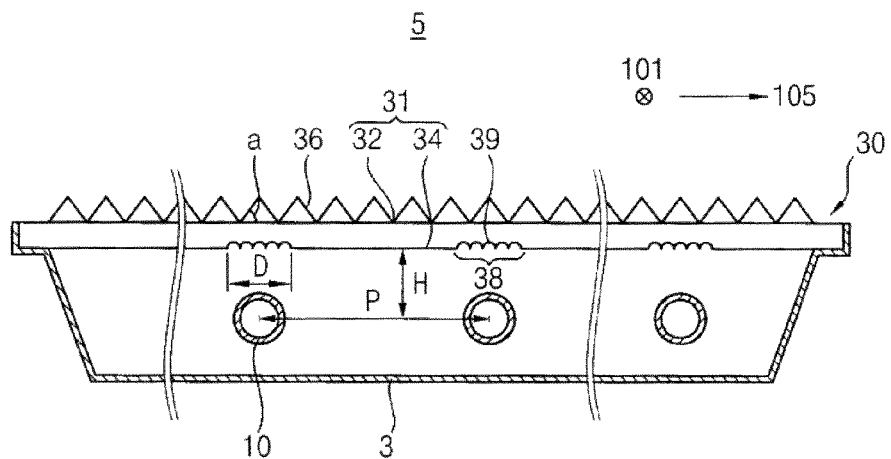
FIG. 1 is a cross-sectional view illustrating a backlight assembly in accordance with an embodiment of the present invention.

Embodiments of the present invention are described more fully hereinafter with reference to the accompanying drawings, in which exemplary embodiments of the present invention are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present.

Hereinafter, exemplary embodiments of the present invention will be explained in detail with reference to the accompanying drawings.

FIG. 1 is a cross-sectional view illustrating a backlight assembly in accordance with an embodiment of the present invention.

Referring to FIG. 1, a backlight assembly 5 includes a plurality of lamps 10 and an optical member 30.

The lamps 10 are substantially parallel with one another and separated from on one another by a center-to-center distance P.

Each of the lamps 10 may include a lamp tube extending in a first direction X 101 and electrodes.

The lamp tube may include glass. A fluorescent layer having a predetermined thickness may be formed on an internal surface of the lamp tube. The fluorescent layer receives non-visible light to generate visible light. An internal space of the lamp tube is filled with discharge gases. The discharge gas is excited by electrons and generates the non-visible light, such as ultraviolet (UV) light. The discharge gases may include mercury gas, argon gas, etc.

The electrodes may enclose end portions of the lamp tube and be combined with the lamp tube. The electrodes receive voltages for driving the lamp.

When the electrodes receive high voltages, the electrodes emit electrons. The discharge gases in the lamp tube receive the electrons to be excited to a higher energy level. When the excited discharge gases return to a stable energy state, UV light is generated from the discharge gases. The fluorescent layer formed on the internal surface of the lamp tube generates visible light in response to receiving the UV light generated from the discharge gases. The visible light generated by the fluorescent layer is emitted from the lamp tube.

The optical member 30 is disposed on the lamps 10 to improve brightness uniformity of the light generated from the lamps 10. The optical member 30 may be formed of a polymer resin which has properties including high transmissivity, diffusivity, thermal resistance, chemical resistance, mechanic strength, etc. Examples of a polymer resin may include polymethylmethacrylate, polyamide, polyimide, polypropylene, polyurethane, etc.

The backlight assembly 5 may further include a receiving container 3. The receiving container 3 may include a bottom part and a sidewall part extending from a side portion of the bottom part. The receiving container 3 receives the lamps 10. The lamps 10 may be disposed on the bottom part of the receiving container 3 in parallel. The optical member 30 is supported by the sidewall part of the receiving container 3 and disposed on the lamps 10.

The optical member 30 may include a base body 31, a plurality of light-concentrating lenses 36 and a plurality of light-diffusing patterns 38 separated from each other along a second direction 105.

The base body 31 may include a thin sheet or a thick plate. The base body 31 may have a first surface 32 exiting light and a second surface 34 opposite to the first surface 32. The second surface 34 receives the light generated by the lamps 10.

The light-concentrating lenses 36 are formed on the first surface 32 of the base body 31 at a first pitch. The first pitch is defined by a distance between center portions of adjacent light-concentrating lenses 36. The first pitch may be in a range of about 30 μm to about 100 μm. The light-concentrating lenses 36 change paths of the light received by the second surface 34, so that angles between paths of light emitted from the optical member 30 and a virtual normal line with respect to the first surface 32 of the base body 31 may be reduced.

The light-concentrating lenses 36 may protrude from the first surface 32 of the base body 31. The light-concentrating lenses 36 may have a substantially prism shape or a substantially half-cylindrical shape which may extend in the first direction 101. Each of the light-concentrating lenses 36 may have a cross-section of a substantially triangular shape or a substantially semicircular shape.

Alternatively, the light-concentrating lenses 36 may have a substantially pyramidal shape or a substantially hemispherical shape.

A portion of the light incident upon the second surface 34 of the base body 31 may be transmitted through the light-concentrating lenses 36 and another portion of the light incident upon the second surface 34 of the base body 31 may be reflected by the light-concentrating lenses 36. As an amount of the light reflected by the light-concentrating lenses 36 increases, the brightness of the backlight assembly 5 may be reduced and the brightness uniformity of the light emitted from the backlight assembly 5 may also be reduced. The transmission or the reflection of the light is determined by an angle between an upper surface of the light-concentrating lens 36 and a path of the light incident upon the upper surface of the light-concentrating lens 36.

The light-diffusing patterns 38 may be formed on the second surface 34 of the base body 31 and respectively correspond to the lamps 10. For example, each of the light-diffusing patterns 38 may be formed directly over a corresponding lamp 10. The light-diffusing patterns 38 diffuse the light generated by the lamps 10 to change the angle between the upper surface of the light-concentrating lens 36 and the path of the light incident upon the upper surface of the light-concentrating lens 36. Accordingly, the light-diffusing patterns 38 may reduce the amount of the light reflected by the light-concentrating lenses 36 so that the brightness of the backlight assembly 5 may be increased.

Each of the light-concentrating patterns 38 may include a plurality of grooves 39 which are formed on the second surface 34 of the base body 31 and extend in the first direction 101. Each of the grooves 39 has a concave surface with respect to the second surface 34 of the base body 31. The grooves 39 may be adjacent to one another. The grooves 39 may be formed on the second surface 34 of the base body 31 at a second pitch. The second pitch is defined by a distance between center portions of adjacent grooves 39. The second pitch may be smaller than the first pitch of the light-concentrating lenses 36. For example, the second pitch may be in a range of about several micrometers to about several tens of micrometers.

The grooves 39 may have a cross-section of a substantially semicircular shape, a substantially half-oval shape or a polygon shape. FIG. 1 illustrates the grooves 39 having the cross-section of the substantially semicircular shape. The grooves 39 receive the light generated by the lamps 10 to diffuse the light, so that an angle between a path of light diffused by the grooves 39 and a virtual normal line with respect to the second surface 34 of the base body 31 may increase. Therefore, the light-diffusing patterns 38 may reduce the amount of the light reflected by the light-concentrating lenses 36.

Figure 2:
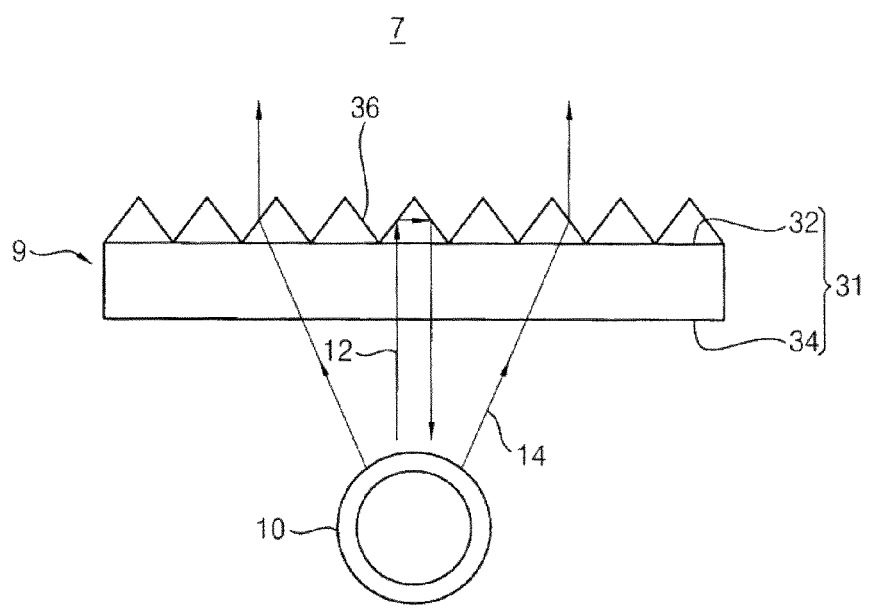
FIG. 2 is a cross-sectional view illustrating a backlight assembly having an optical member which does not have a diffusing pattern.
Figure 3:
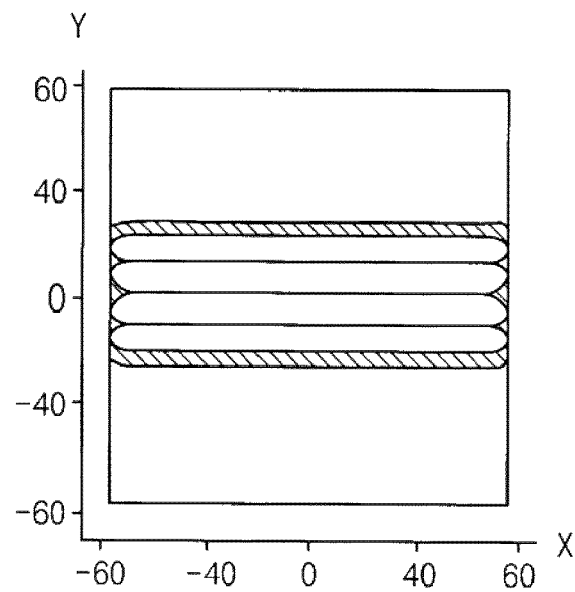
FIG. 3 is a graph illustrating the brightness of light exiting from the backlight assembly illustrated in FIG. 2.

FIG. 2 is a cross-sectional view illustrating a backlight assembly 7 having an optical member which does not have the light-diffusing patterns. FIG. 3 is a graph illustrating the brightness of light exiting from the backlight assembly illustrated in FIG. 2. An optical member 9 shown in FIG. 2 has a structure that is substantially the same as that of the optical member shown in FIG. 1, except that the optical member 9 does not have the light-diffusing patterns. Thus, the same or similar components are referred to using the same reference numerals illustrated in FIG. 1.

Referring to FIG. 2, the optical member 9 includes a base body and a plurality of light-concentrating lenses 36. The base body includes a first surface 32 and a second surface 34. The second surface 34 faces the lamp 10. The first surface 32 is opposite to the second surface 34. The second surface 34 of the base body is flat because the light-diffusing patterns shown in FIG. 1 are not formed on the second surface 34 of the base body. The light-concentrating lenses 36 are formed on the first surface 32 of the base body.

A first light 12 perpendicularly incident upon the second surface 34 of the base body may be fully reflected by the light-concentrating lenses 36, because the second surface 34 of the base body is flat. A second light 14 incident at an angle upon the second surface 34 of the base body may be refracted by the light-concentrating lenses 36 to be perpendicularly emitted from the light-concentrating lenses 36.

Referring to FIG. 3, the light passing through the optical member 9 forms relatively dark regions disposed directly on the lamps and between adjacent lamps 10, so that the brightness uniformity of the light passing through the optical member may be reduced. The dark region disposed directly over the lamps 10 may be caused by the full reflection of the light perpendicularly incident upon the second surface 34 of the base body.

Figure 4:
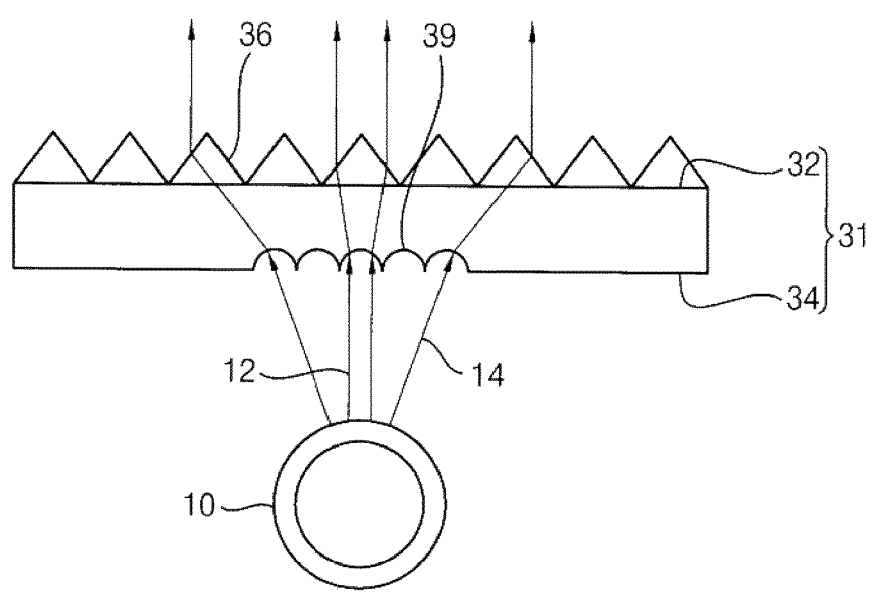
FIG. 4 is a cross-sectional view illustrating light paths in the backlight assembly illustrated in FIG. 1.
Figure 5:
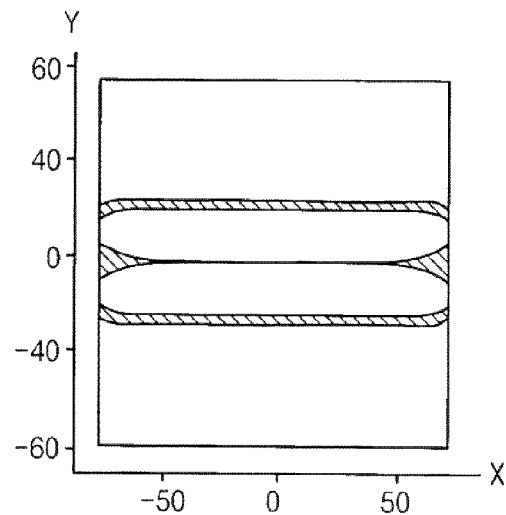
FIG. 5 is a graph illustrating the brightness of light exiting from the backlight assembly illustrated in FIG. 1.

FIG. 4 is a cross-sectional view illustrating light paths in the backlight assembly illustrated in FIG. 1. FIG. 5 is a graph illustrating the brightness of light exiting from the backlight assembly illustrated in FIG. 1.

Referring to FIGS. 1 and 4, the optical member 30 includes the light-diffusing patterns 38 respectively corresponding to the lamps 10 are formed on the second surface 34 of the base body 31. As illustrated above, each of the light-diffusing patterns 38 may include the grooves 39 to diffuse the light incident upon the second surface 34 of the base body 31, so that the amount of the light fully reflected by the light-concentrating lenses 36 may be reduced.

Referring to FIG. 5, when compared to the optical member illustrated in FIGS. 2 and 3, the brightness uniformity of the light passing through the optical member 30 may be improved. For example, since the light-diffusing patterns 38 diffuse the light incident upon the second surface 34 of the base body 31, the dark region formed directly over the lamps 10 may be prevented and the dark region formed between adjacent lamps 10 may be reduced.

When a width D of each of the light-diffusing patterns 38 is relatively large, an amount of light perpendicularly emitted from the light-concentrating lenses 36 with respect to the first surface 32 of the base body may be decreased. When the width D of each of the light-diffusing patterns 38 is relatively small, dark regions may be formed directly over the lamps 10 and between adjacent lamps 10.

The width D of each of the light-diffusing patterns 38 may be in a range determined by Inequality 1:

$$H \times \tan\{90° - a - \cos^{-1}(1/n)\} < D < H \times \tan\{90° - 3a - \cos^{-1}(1/n)\}, \quad (1)$$

in which 'H' refers to a distance between a center portion of the lamps 10 and the second surface 34 of the base body 31, 'a' refers to an acute angle between the first surface 32 of the base body 31 and the upper surface of the light-concentrating lens 36, and 'n' refers to a refractive index of the light-concentrating lenses 36.

In exemplary embodiments of the present invention, when the width D of each of the light-diffusing patterns 38 is determined based on a shape and a material of each of the light-concentrating lenses 36 and a distance between the lamps 10 and the optical member 30, etc., the optical member may be optimized for the backlight assembly 5.

The backlight assembly 5 may further include a diffusing plate (not shown) and a brightness enhancement sheet (not shown). The diffusing plate may be disposed between the lamps 10 and the optical member 30 to diffuse the light generated by the lamps 10 to provide the optical member with the diffused light. The brightness enhancement sheet may be disposed on the optical member 30 to improve the brightness of the light passing through the optical member 30.

Figure 6:
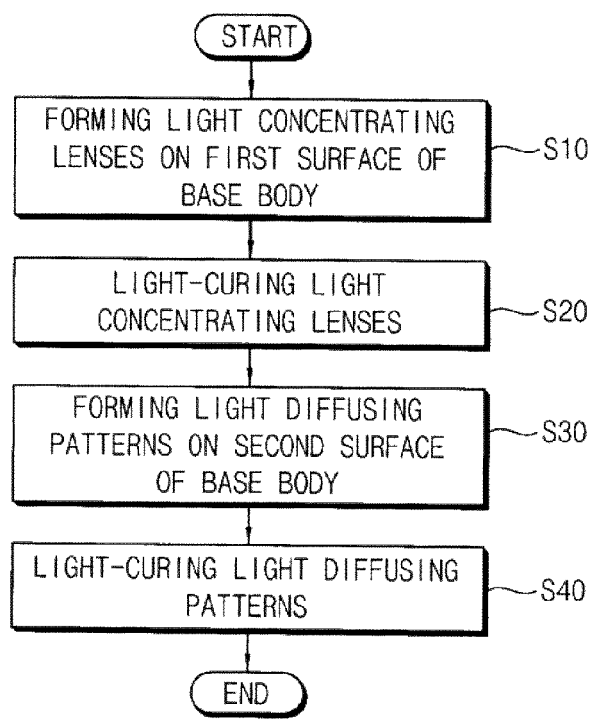
FIG. 6 is a flowchart illustrating a method of manufacturing an optical member illustrated in FIG. 1.
Figure 7:
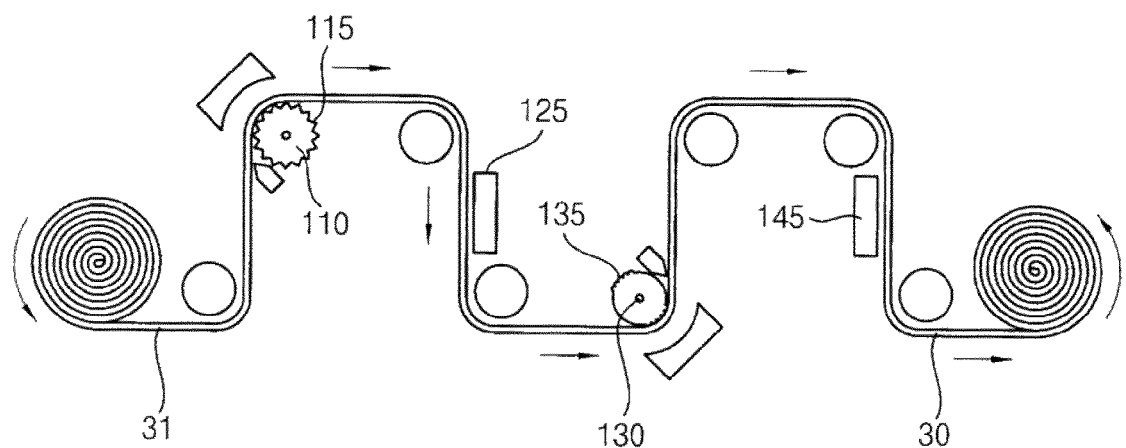
FIG. 7 is a cross-sectional view illustrating the method of manufacturing the optical member in accordance with the flowchart illustrated in FIG. 6.

FIG. 6 is a flowchart illustrating a method of manufacturing an optical member illustrated in FIG. 1. FIG. 7 is a cross-sectional view illustrating the method of manufacturing the optical member in accordance with the flowchart illustrated in FIG. 6.

Referring to FIGS. 6 and 7, in a method of manufacturing the optical member illustrated in FIG. 1 in accordance with exemplary embodiments of the present invention, the base body 31 may be transported between rollers to simultaneously form in one in-line process the light-concentrating lenses 36 on the first surface 32 of the base body 31 and the light-diffusing patterns 38 on the second surface 34 of the base body 31.

As illustrated in FIG. 7, the light-concentrating lenses 36 are formed on the first surface 32 of the base body 31 at the first pitch (step S10).

In order to form the light-concentrating lenses 36, a second roller 110 having external surface valleys 115 corresponding to the light-concentrating lenses 36 rolls on the first surface 32 of the base body 31 to form the light-concentrating lenses 36 on the first surface 32 of the base body 31.

The second roller 110 is fixed to a predetermined position and rolls in a direction in which the base body 31 is transported. The valleys 115 for forming the light-concentrating lenses 36 are formed on the external surface of the second roller 110. The valleys 115 may have a shape that is substantially complementary to that of the light-concentrating lenses 36. For example, when the light-concentrating lenses 36 has a shape of a triangular prism shape protruding from the first surface 32 of the base body 31, the valleys 115 may have a shape of a triangular prism shape descending from the external surface of the second roller 110. The valleys 115 may be formed entirely on the external surface of the second roller 110 at the first pitch.

After the second roller 110 rolls on the first surface 32 of the base body 31, a second curing device 125 irradiates light such as UV light on the first surface 32 of the base body 31 to form the light-concentrating lenses 36 which are cured by the light irradiated by the second curing device 125 (step S20).

Figure 8:
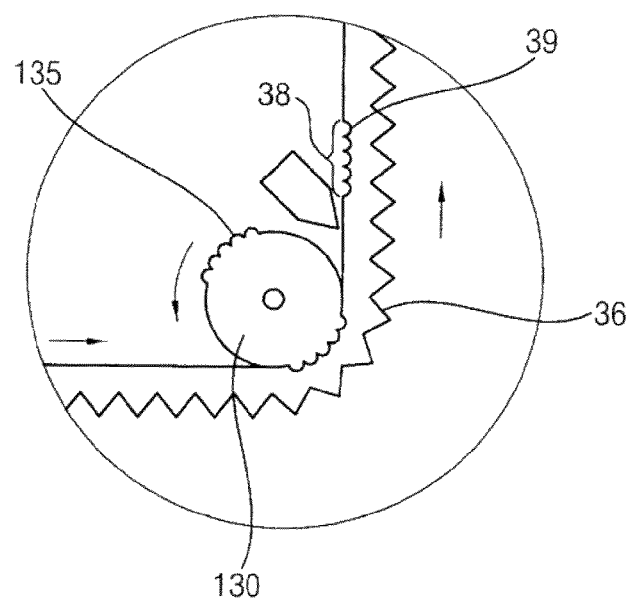
FIG. 8 is a partial enlarged cross-sectional view illustrating a first roller illustrated in FIG. 7.

FIG. 8 is a partial enlarged cross-sectional view illustrating a first roller 130 illustrated in FIG. 7.

Referring to FIGS. 7 and 8, when the base body 31 having the light-concentrating lenses 36 is transported, the light-diffusing patterns 38 are formed on the second surface 34 of the base body 31 by the first roller 130.

The first roller 130 rolls on the second surface 34 of the base body 31 to form the light-diffusing patterns 38 on the second surface 34 of the base body 31 (step S30). Patterns 135 corresponding to the light-diffusing patterns 38 are formed on an external surface of the first roller 130. The patterns 135 of the first roller 130 may be separated from one another by a predetermined distance. Each of the patterns 135 of the first roller 130 may include protrusions corresponding to the grooves 39 of each light-diffusing pattern 38. The protrusions may have a shape that is substantially complementary to that of the grooves 39. The protrusions may be formed on the external surface of the first roller 130 at the second pitch. A distance between center portions of adjacent light-diffusing patterns 38 may be substantially the same as a distance P between adjacent lamps 10.

After the first roller 130 rolls on the second surface 34 of the base body 31, a first curing device 145 irradiates UV light on the second surface 34 of the base body 31 to form the light-diffusing patterns 38 which are cured by the UV light (step S40).

The optical member 30 may be manufactured by cutting the base body 31 having the light-concentrating lenses 36 and the light-diffusing patterns 38 into a required size.

According to exemplary embodiments of the present invention illustrated above, the light-concentrating lenses 36 may improve the front brightness of the light passing through the optical member 30 and the light-diffusing patterns 38 may reduce the dark regions caused by the full reflection of the light-concentrating lenses 36. Therefore, exemplary embodiments of the present invention may convert linear light generated by the lamps 10 into planar light having high brightness uniformity.

Figure 9:
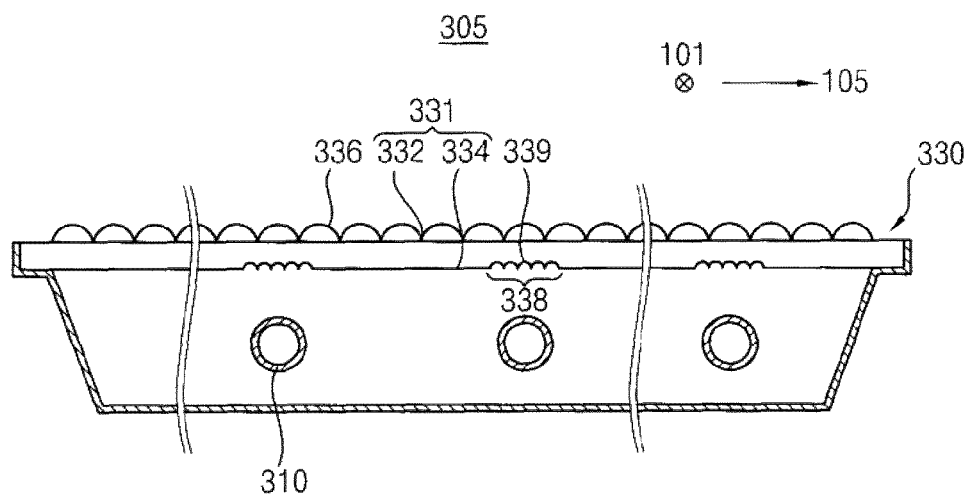
FIG. 9 is a cross-sectional view illustrating a backlight assembly in accordance with an embodiment of the present invention.

FIG. 9 is a cross-sectional view illustrating a backlight assembly in accordance with an embodiment of the present invention.

Referring to FIG. 9, a backlight assembly 305 has a structure that is substantially the same as that of the backlight assembly 5 illustrated in FIGS. 1, 4 and 5, except for an optical member 330 of the backlight assembly 305. The optical member 330 has a structure and a function that are substantially the same as those of the optical member 30 illustrated in FIGS. 1, 4 and 5, except that light-concentrating lenses 336 of the optical member 330 has a shape which is different from that of the light-concentrating lenses 36 of the optical member 30. Thus, any repetitive explanation will be omitted.

As illustrated in FIG. 9, the light-concentrating lenses 336 may have a substantially half-cylindrical shape. Thus, the light-concentrating lenses 336 may have a cross-section of a substantially semicircular shape, a substantially half-oval shape or a shape substantially similar to a semicircular shape or a half-oval shape. The light-concentrating lenses 336 having the half-cylindrical shape may extend in the first direction 101. Alternatively, the light-concentrating lenses 336 may have a substantially hemispherical shape.

In this embodiment of the present invention, a method of manufacturing the optical member 336 is substantially the same as the method of manufacturing the optical member illustrated in FIGS. 6 to 8, except for a shape of the external surface of a second roller for forming the light-concentrating lenses 336.

Since the light-concentrating lenses 336 has the substantially half-cylindrical shape protruding from the first surface 32 of the base body 331 and extending in the first direction, the valleys formed on the external surface of the second roller may have a substantially half-cylindrical shape descending from the external surface of the first roller and extending in the first direction.

Figure 10:
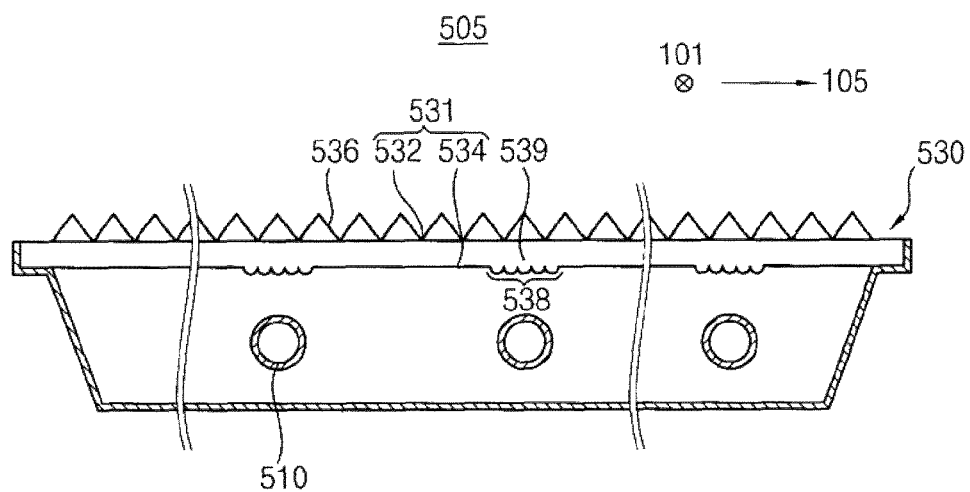
FIG. 10 is a cross-sectional view illustrating a backlight assembly in accordance with another embodiment of the present invention.

FIG. 10 is a cross-sectional view illustrating a backlight assembly in accordance with another embodiment of the present invention.

Referring to FIG. 10, a backlight assembly 505 has a structure that is substantially the same as that of the backlight assembly 5 illustrated in FIGS. 1, 4 and 5, except for an optical member 530 of the backlight assembly 505. The optical member 530 has a structure and a function that are substantially the same as those of the optical member 30 illustrated in FIGS. 1, 4 and 5, except that light-diffusing patterns 538 of the optical member 530 has a shape which is different from that of the light-diffusing patterns 38 of the optical member 30. Thus, any repetitive explanation will be omitted.

Each of the light-diffusing patterns 538 may include light-diffusing protrusions which protrude from the first surface 532 of the base body 531 and extend in the first direction 101. The light-diffusing protrusions 539 have an external surface which is convex with respect to the first surface 532 of the base body 531. The light-diffusing protrusions 539 may be formed at a pitch which is the substantially the same as that of the grooves 39 illustrated in FIG. 1. The light-diffusing protrusions 539 may have a function which is substantially the same as or similar to that of the grooves 39 illustrated in FIG. 1. For example, the light-diffusing protrusions 539 diffuse the light perpendicularly incident upon the first surface 532 of the base body 531 to reduce an amount of light fully reflected by light-concentrating lenses 536. Therefore, the light-diffusing patterns 538 may prevent the dark regions from being caused by the light reflection of the light-concentrating lenses 536.

In this embodiment of the present invention, a method of manufacturing the optical member 536 is substantially the same as the method of manufacturing the optical member illustrated in FIGS. 6 to 8, except for a shape of the external surface of a first roller for forming the light-diffusing patterns 536.

Since the light-diffusing protrusions 539 of each light-diffusing pattern 538 have a shape protruding from the first surface 532 of the base body 531 and extending in the first direction, patterns having valleys descending from an external surface of the first roller and extending in the first direction 101 may be formed on the external surface of the first roller. After the first roller rolls on the second surface 534 of the base body 531, the light-diffusing patterns 538 formed on the second surface 534 of the base body 531 are cured by UV light irradiated by a first curing device.

Figure 11:
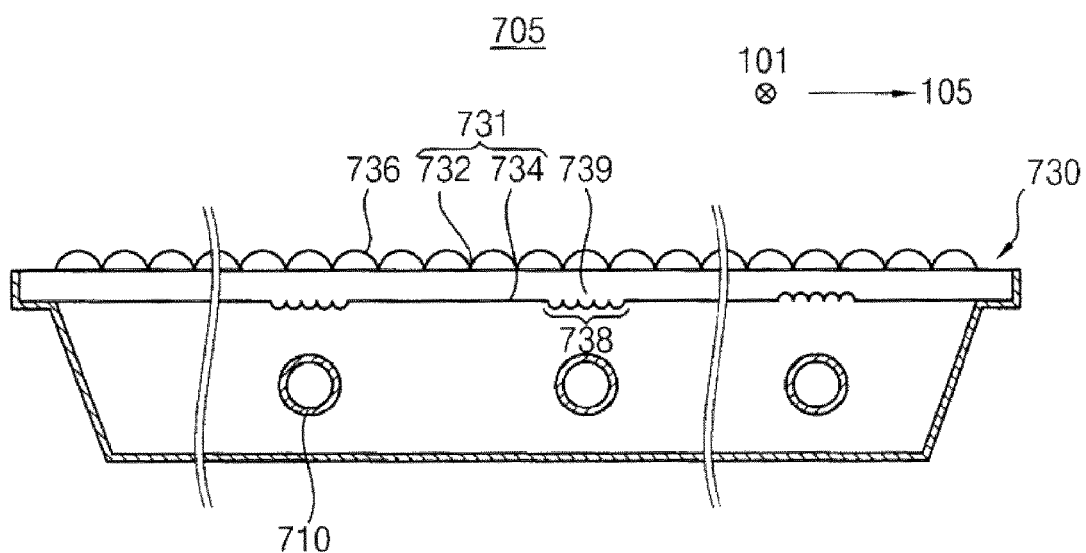
FIG. 11 is a cross-sectional view illustrating a backlight assembly in accordance with another embodiment of the present invention.

FIG. 11 is a cross-sectional view illustrating a backlight assembly in accordance with another embodiment of the present invention.

Referring to FIG. 11, a backlight assembly 705 has a structure that is substantially the same as that of the backlight assembly 5 illustrated in FIGS. 1, 4 and 5, except for an optical member 730 of the backlight assembly 705. The optical member 730 has a structure and a function that are substantially the same as those of the optical member 30 illustrated in FIGS. 1, 4 and 5, except that light-concentrating lenses 736 and light-diffusing patterns 738 of the optical member 530 have shapes which are different from those of light-concentrating lenses 36 and the light-diffusing patterns 38 of the optical member 30. Thus, any repetitive explanation will be omitted.

The light-concentrating lenses 736 may have a substantially half-cylindrical shape. Thus, the light-concentrating lenses 736 may have a cross-section of a substantially semicircular shape, a substantially half-oval shape or a substantially similar shape to a semicircular shape or a half-oval shape. The light-concentrating lenses 736 having the half-cylindrical shape may extend in the first direction. Alternatively, the light-concentrating lenses 336 may have a substantially hemispherical shape.

Each of the light-diffusing patterns 738 may include light-diffusing protrusions 739 which protrude from the first surface 732 of the base body 731 and extend in the first direction 101. The light-diffusing protrusions 739 have an external surface which is convex with respect to the first surface 732 of the base body 731. The light-diffusing protrusions 739 may have a function which is substantially the same as or similar to that of the grooves 39 illustrated in FIG. 1. For example, the light-diffusing protrusions 739 diffuse the light perpendicularly incident upon the first surface 732 of the base body 731 to reduce an amount of light fully reflected by light-concentrating lenses 736. Therefore, the light-diffusing patterns 738 may substantially prevent the dark regions from being caused by the light reflection of the light-concentrating lenses 736.

In this embodiment of the present invention, a method of manufacturing the optical member 730 is substantially the same as the method of manufacturing the optical member illustrated in FIGS. 6 to 8, except for a shape of an external surface of a second roller for forming the light-concentrating lenses 736 and a shape of an external surface of a first roller for forming the light-diffusing patterns 738.

First valleys formed on the external surface of the second roller may have a shape that is substantially complementary to that of the light-concentrating lenses 736. In addition, second valleys formed on the external surface of the first roller may have a shape that is substantially complementary to that of the light-diffusing protrusions 739 of the light-diffusing patterns 738.

In the optical member, the method of manufacturing the optical member and the backlight assembly in accordance with exemplary embodiments of the present invention, since an optical member may convert linear light generated by lamps into planar light having high brightness uniformity, the quality of the light emitted from the backlight assembly may be improved.

The foregoing is illustrative of exemplary embodiments of the present invention and is not to be construed as limiting thereof. Although a few exemplary embodiments of the present invention have been described, those skilled in the art will readily appreciate that many modifications are possible in the exemplary embodiments without materially departing from the teachings of this disclosure. Accordingly, all such modifications are intended to be included within the scope of the appended claims. Therefore, it is to be understood that the foregoing is illustrative of embodiments of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. An optical member comprising:
a base body having a first surface and a second surface opposite to the first surface, the second surface receiving light from a plurality of light sources;
a plurality of light-concentrating lenses formed on the first surface at a predetermined pitch; and
a plurality of light-diffusing patterns respectively formed at positions of the second surface respectively corresponding to the light sources to reduce an amount of light reflected by the light-concentrating lenses, each of the light-diffusing patterns including curved surfaces extending in a first direction and having a width which is in a range determined by the following inequality $$H \times \tan\{90°-a-\cos^{-1}(1/n)\} < D < H \times \tan\{90°-3a+\cos^{-1}(1/n)\},$$

in which 'H' is a distance between the light sources and the second surface, 'a' is an angle between an external surface of one of the light-concentrating lenses and the first surface, 'n' is a refractive index of the light-concentrating lenses, and 'D' is the width of each light-diffusing pattern.

2. The optical member of claim 1, wherein the curved surfaces comprise convex surfaces with respect to the second surface or concave surfaces with respect to the second surface.

3. The optical member of claim 2, wherein a cross-section of each of the curved surfaces comprises one of a substantially semicircular shape, a substantially half-oval shape and a substantially polygonal shape.

4. The optical member of claim 2, wherein the light-concentrating lenses protrude from the first surface and have a substantially prism shape or a substantially half-cylindrical shape.

5. The optical member of claim 1, wherein the light-diffusing patterns are separated from one another in a second direction substantially perpendicular to the first direction.

6. A backlight assembly comprising:
a plurality of lamps disposed in parallel and separated from one another; and
an optical member comprising:
a base body disposed on the lamps, the base body having a first surface emitting light and a second surface opposite to the first surface, the second surface receiving the light from the lamps;
a plurality of light-concentrating lenses formed on the first surface at a predetermined pitch; and
a plurality of light-diffusing patterns respectively formed at positions of the second surface which are respectively disposed directly on the lamps, each of the light-diffusing patterns having a width which is in a range determined by the following inequality, $$H \times \tan\{90°-a-\cos^{-1}(1/n)\} < D < H \times \tan\{90°-3a+\cos^{-1}(1/n)\},$$

in which 'H' is a distance between the lamps and the second surface, 'a' is an angle between an external surface of one of the light-concentrating lenses and the first surface, 'n' is a refractive index of the light-concentrating lenses, and 'D' is the width of each light-diffusing pattern.

7. The backlight assembly of claim 6, wherein each of the light-diffusing patterns includes curved surfaces extending in a first direction.

8. The backlight assembly of claim 7, wherein the curved surfaces comprise convex surfaces with respect to the second surface or concave surfaces with respect to the second surface.

9. The backlight assembly of claim 8, wherein a cross-section of each of the curved surfaces comprises one of a substantially semicircular shape, a substantially half-oval shape and a substantially polygonal shape.

10. The backlight assembly of claim 9, wherein the light-concentrating lenses protrude from the first surface and have a substantially prism shape or a substantially half-cylindrical shape.

11. The backlight assembly of claim 10, further comprising:
a receiving container comprising a bottom plate on which the lamps are disposed and sidewalls supporting the optical member;
a diffusing plate disposed between the lamps and the optical member; and
a brightness enhancement sheet disposed on the optical member.

12. The backlight assembly of claim 7, wherein the light-diffusing patterns are separated from one another in a second direction substantially perpendicular to the first direction.

* * * * *